United States Patent
Swoboda

(10) Patent No.: US 9,350,458 B2
(45) Date of Patent: May 24, 2016

(54) DISTURBANCE TOLERANT OPTICAL DEVICE

(71) Applicant: Avago Technologies General IP (Singapore) Pte. Ltd., Singapore (SG)

(72) Inventor: Robert Swoboda, Vienna (AT)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 173 days.

(21) Appl. No.: 14/161,089

(22) Filed: Jan. 22, 2014

(65) Prior Publication Data

US 2015/0207571 A1      Jul. 23, 2015

(51) Int. Cl.
| | |
|---|---|
| *H04B 10/00* | (2013.01) |
| *H04B 10/69* | (2013.01) |
| *H04B 10/2507* | (2013.01) |
| *H04B 10/80* | (2013.01) |

(52) U.S. Cl.
CPC .......... *H04B 10/691* (2013.01); *H04B 10/2507* (2013.01); *H04B 10/802* (2013.01)

(58) Field of Classification Search
CPC ......................... H04B 10/691; H04B 10/2507
See application file for complete search history.

(56) References Cited

U.S. PATENT DOCUMENTS

| | | | |
|---|---|---|---|
| 2006/0202124 A1* | 9/2006 | Hoult | G01J 3/2803 250/349 |
| 2013/0221219 A1* | 8/2013 | Torabi | G01J 5/046 250/338.1 |
| 2013/0330072 A1* | 12/2013 | Xia | H04B 10/40 398/26 |
| 2014/0312234 A1* | 10/2014 | Tan | G01J 1/4228 250/349 |
| 2014/0363166 A1* | 12/2014 | Lacovara | H04B 13/02 398/104 |

OTHER PUBLICATIONS

"Multi Element Photodiode Array ", *OSI Optoelectronics* Unavailable Pub. Date.
"Photonic Analog to Digital Converters", *The Aerospace Corporation* 2007.

* cited by examiner

*Primary Examiner* — Dzung Tran

(57) ABSTRACT

In one embodiment, an optical device having a first and second group of the plurality of sensors is disclosed. The first and second group of the plurality of sensors may have a first and second center of gravity region respectively. The plurality of sensors may be arranged such that the first and second center of gravity region may be substantially overlapping so as disturbances created by a time varying field on the first and second group of the plurality of sensors may be substantially similar in magnitude. In another embodiment, a fiber optic transmission system having first and second groups of the plurality of sensors being arranged around a center of gravity region is disclosed. In yet another embodiment, an optical transceiver having first and second sets of the plurality of sensors arranged such that center of gravity of each group is formed at the center region is disclosed.

20 Claims, 14 Drawing Sheets

DISTURBANCE TOLERANT OPTICAL DEVICE

BACKGROUND

One major component of optical devices for detecting light may be photo-detectors. Generally, photo-detectors convert light into electrical signals. However, the conversion of light into electrical signals may be affected by disturbances from surroundings. For applications such as fiber optics communication system, the disturbances may induce bit error or to a lesser extent, may reduce the communication speed. For other sensing applications such as encoders and opto-couplers, the disturbances may produce noise, which may reduce sensitivity of the optical devices. Further, the disturbance from surroundings may be almost unavoidable for optical devices that are used in industrial settings. Even for consumer or home appliances, the issue of disturbances may become more serious.

Additionally, the disturbance may add burdens to the package design. Package designers and housing designers may be required to add shielding or may impose design requirements to ensure that the disturbance received in the optical devices are minimal. The task to meet those requirements may be difficult for some applications. For example, in fiber optic communication, the optical devices may be placed in locations that are susceptible to high noise. For optical devices that are used in industrial settings, the optical devices may be required to operate in a high noise environment. As users demand small compact devices, more and more devices may be packed into limited space resulting in higher disturbances for consumer use optical devices. Some efforts have been attempted to reduce the effect of such disturbances through packaging and shielding the optical devices. However, such efforts may have not been completely effective.

BRIEF DESCRIPTION OF THE DRAWINGS

Illustrative embodiments by way of examples, not by way of limitation, are illustrated in the drawings. Throughout the description and drawings, similar reference numbers may be used to identify similar elements. The drawings may be simplified for illustrative purpose only to assist understanding and may not be drawn per actual scale.

DETAILED DESCRIPTION

Figure 1A:
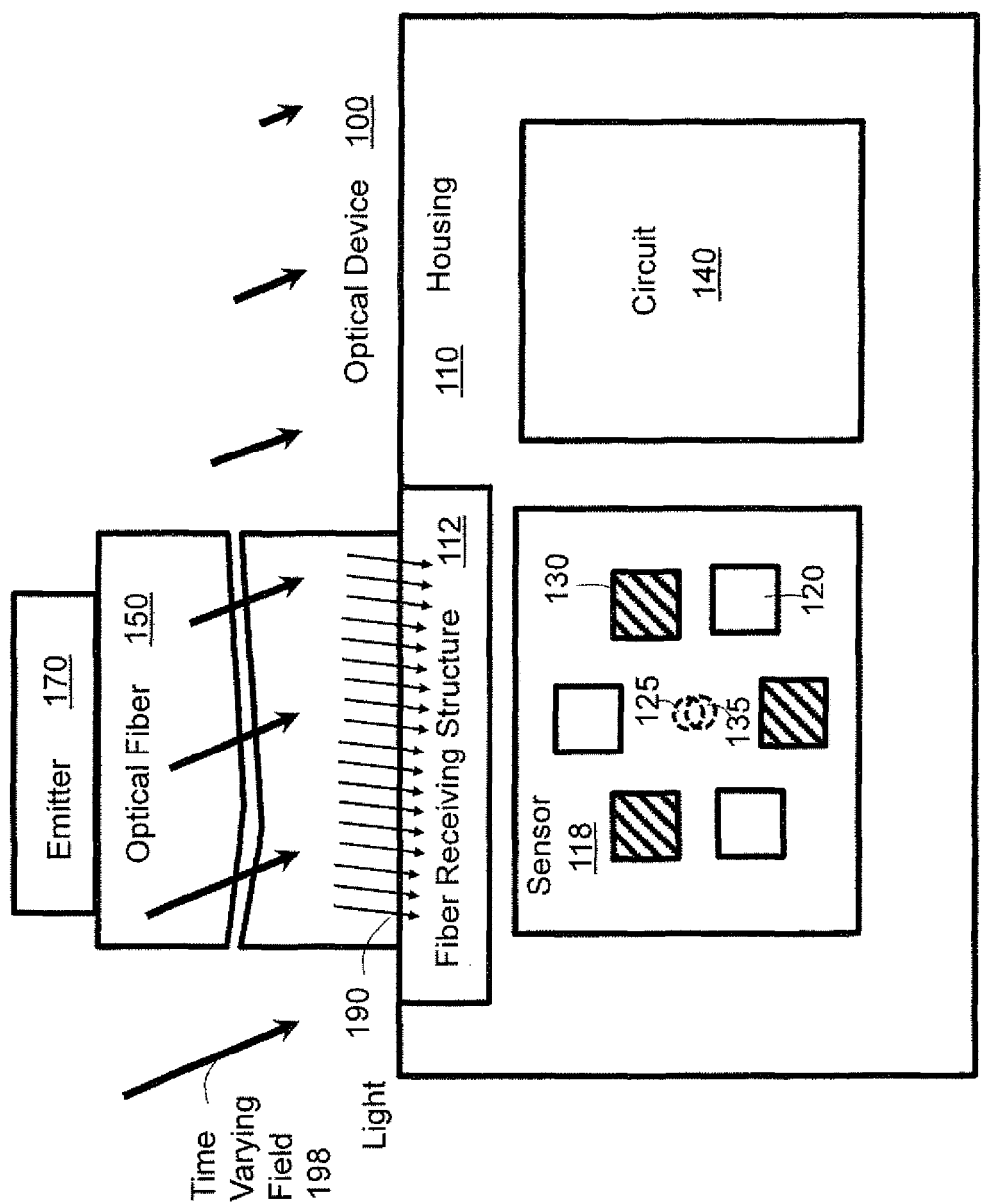
FIG. 1A shows a block diagram of an optical device for sensing incident light.

FIG. 1A shows a block diagram of an optical device for sensing incident light 190. The incident light 190 may be visible or invisible. In other words, the incident light 190 may be an electro-magnetic having a wavelength of visible light or invisible light. The incident light 190 may be transmitted from an emitter 170 to the optical device 100 through an optical fiber 150. For fiber communication applications use, the optical device 100 may optionally comprise a housing 110 having a fiber receiving structure 112 to receive the optical fiber 150. The fiber receiving structure 112 may be a receptacle configured to receive the optical fiber 150. The incident light 190 may be indicative of a signal emitted from the emitter 170. In another embodiment where the optical device 100 is an encoder or a light sensor, the incident light 190 may be directly received from the emitter 170 without being transmitted through the optical fiber 150.

The optical device 100 may be configured to sense the incident light 190. The optical device 100 may comprise a plurality of sensors 118 and a circuit 140. The plurality of sensors 118 may be photo-detectors such as photodiodes, phototransistors or any other device capable of converting light into an electrical signal. The circuit 140 may be formed integrally with the plurality of sensors 118. The plurality of sensors 118 may be arranged in a substantially co-planar arrangement configured to generate photo-signals. The plurality of sensors 118 may comprise a first group 120 of the plurality of sensors 118 configured to be exposed to the incident light 190 and a second group 130 of the plurality of sensors 118 configured to be shielded from the incident light 190. The first group 120 of the plurality of sensors 118 may be arranged around a first center of gravity region 125, whereas the second group 130 of the plurality of sensors 118 may be arranged around a second center of gravity region 135. The first group 120 of the plurality of sensors 118 and the second group 130 of the plurality of sensors 118 may comprise substantially equal number of sensors 118. The sensors 118 may be arranged in an array or a non-array form as will be illustrated in forthcoming paragraphs.

Figure 1B:
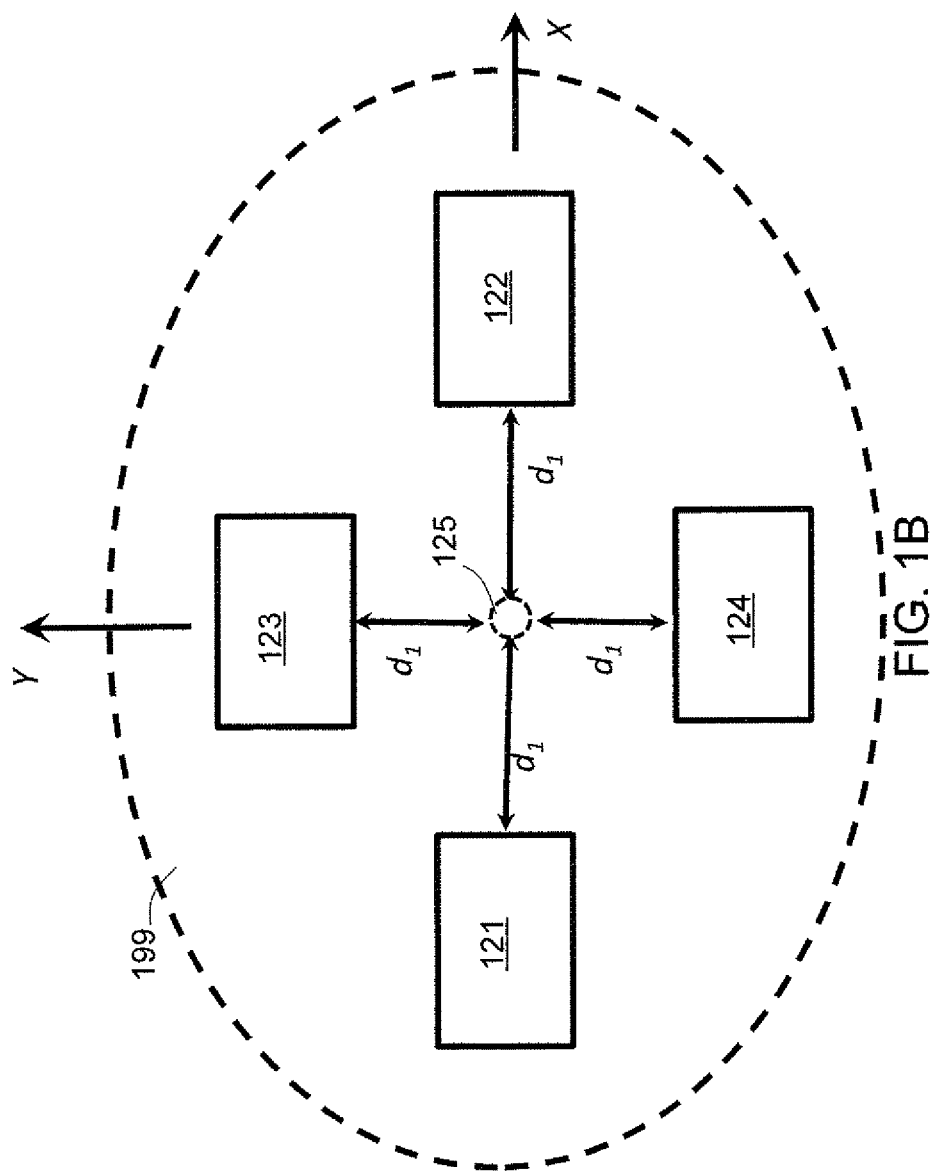
FIG. 1B shows a plurality of sensors of the optical device shown in FIG. 1A.

An example is illustrated using FIG. 1B that shows only the first group 120 of the plurality of sensors 118. The second group 130 of the plurality of sensors 118 are not drawn in FIG. 1B. In FIG. 1B, the first group 120 of the plurality of sensors 118 may comprise a first photo detector 121 and a second photo detector 122 disposed opposing each other at substantially equal distance on both side of the first center of gravity region 125 along a horizontal axis X. The first group 120 of the plurality of sensors 118 may further comprise a third photo detector 123 and a fourth photo detector 124 disposed opposing each other at substantially equal distance on both side of the first center of gravity region 125 along a vertical axis Y. The designed location of the center of gravity of the first group 120 of the plurality of sensors 118 may be at the intersection of the horizontal axis X and the vertical axis Y. Each of the first, second, third and fourth photo detectors 121-124 may be at approximately a distance d1 from the center of gravity of the photo-detectors 121-124. However, due to process variation in manufacturing the sensors 118, the actual center of gravity formed may be slightly offset from the intended location or the design value. However, the actual center of gravity of the first group 120 may be still formed within the first center of gravity region 125. While the center of gravity may be a point in a two dimensional plane, each of the first and second center of gravity regions 125, 135 may be an area or a region within the two dimensional plane where the center of gravity of the first group 120 or the second group 130 of the plurality of sensors 118 may be formed. In one embodiment, each of the center of gravity regions 125, 135 may be an area of approximately less than 2.5 microns from the actual designed location of the center of gravity. For illustrative purposes in highlighting and/or distinguishing the first group 120 from the second group 130 of the plurality of sensors 118, in FIG. 1A and elsewhere the second group 130 is depicted with hatching, while the first group 120 is depicted without hatching.

Figure 1C:
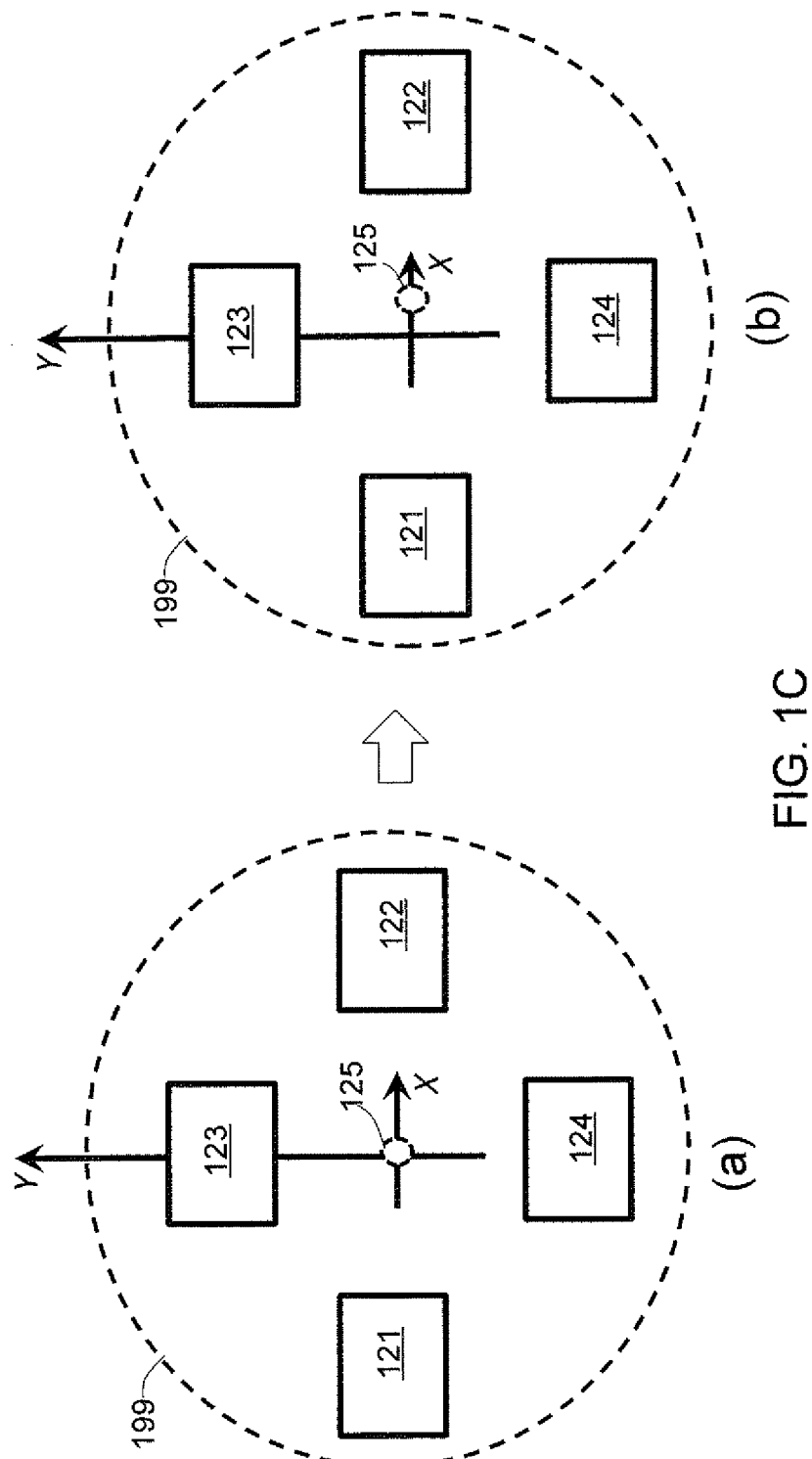
FIG. 1C illustrates a center of gravity region of the optical device used in fiber optics communication under a static light beam.

In addition, the calculation of the center of gravity and/or the center of gravity regions 125, 135 may not be purely geometrical measurement of the sensors 118, but may also take into account optical consideration. For example, in the embodiment shown in FIG. 1C, the light beam 199 illuminated on the photo detectors 121-124 may not be homogeneous and thus, some photo detectors 121-124 may receive more light compared to the other photo detectors 121-124. In such scenario, the center of gravity or the center of gravity region 125 may not be at the center or the cross point of the vertical axis Y and the horizontal axis X as shown in FIG. 1C (a). For example, if the light beam 199 has higher density on the right hand side of the vertical axis Y such that the second photo detector 122 may receive 30% more light compared to the first photo detector 121, while the first photo detector 121, the third photo detector 123 and the fourth photo detector 124 may receive equal amount of light, the center of gravity and the center of gravity region 125 may be shifted to the right as shown in FIG. 1C (b). This may be because the second photo detector 122 has higher weight factor for receiving more light. As illustrated in the embodiment shown in FIG. 1C, the calculation of the center of gravity region 125 may take into consideration the optical design of the optical sensor 100.

Figure 1D:
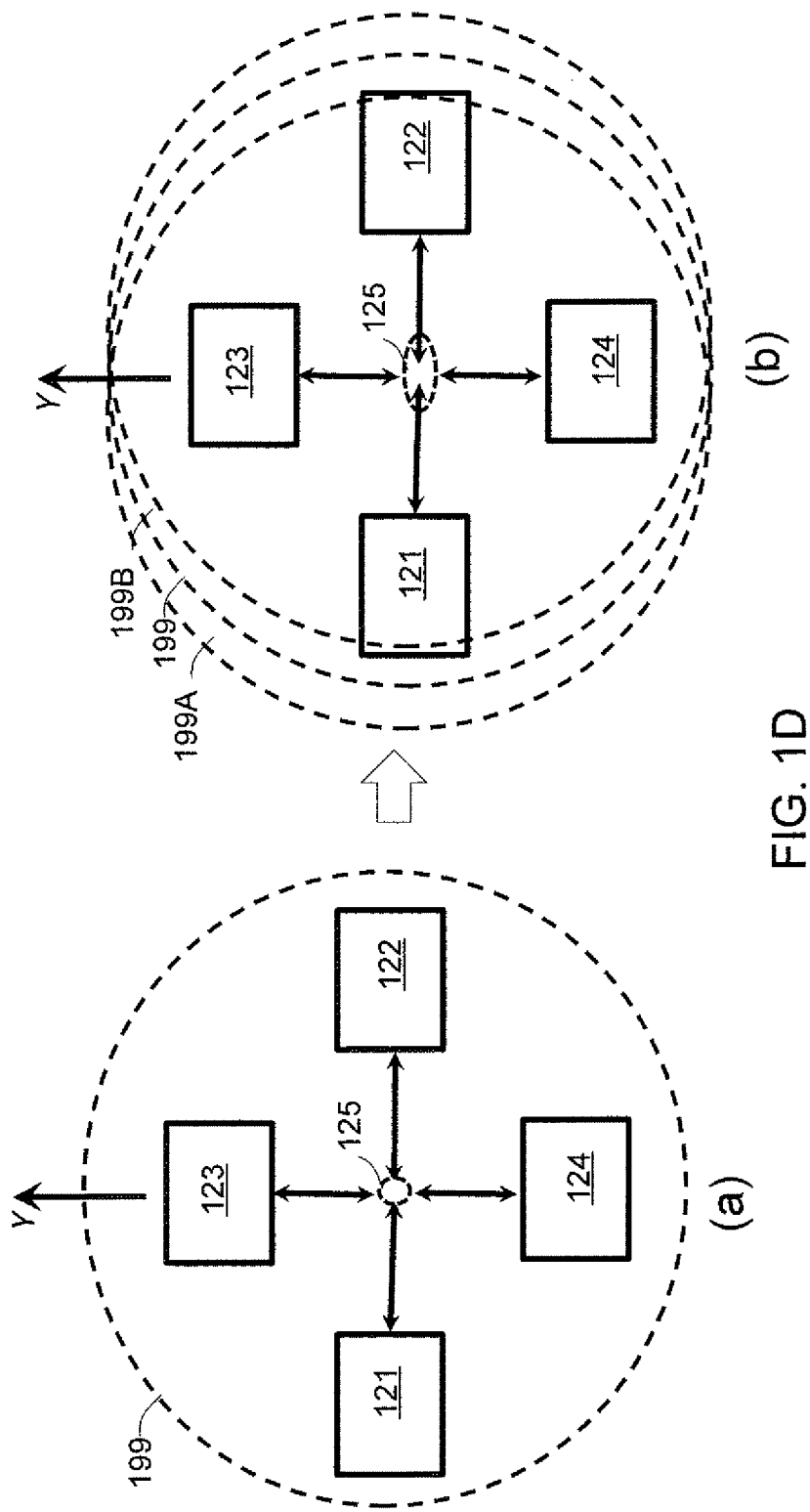
FIG. 1D illustrates a center of gravity region of the optical device used in fiber optics communication under a dynamic light beam.

Consider an optical device 100 comprising first, second, third and fourth photo detectors 121-124 but the light beam may not be in a fixed position shown in FIG. 1D. A typical design of the optical device 100 may be illustrated in FIG. 1D (a) on the left. The light beam 199 may be designed to be at the center of the photo detectors 121-124 as shown in the typical design illustrated in FIG. 1D (a). However, due to assembly tolerance and process tolerance, the actual light beam 199 formed may not be at the designated location. Therefore, when all optical devices 100 produced under an assembly line with such process variation are considered, the light beam 199 may not be formed in a fixed position for each of the optical devices produced in the assembly line.

In addition to the process variation, the light beam 199 may be dynamic and may move relative to a center point for some applications such as an encoder resulting in the light beam not in a fixed position but in a region. For illustration purpose, consider the embodiment shown in FIG. 1D (a) having a homogeneous light beam 199 with all photo detectors 121-124 receiving an equal amount of light as shown in FIG. 1D (a). However, the light beam 199 formed may be either approximately twenty microns towards the left as illustrated by the light beam 199A, or approximately twenty microns towards the right as illustrated by the light beam 199B as shown in FIG. 1D (b). In this example, the center of gravity region 125 may be as shown in FIG. 1D (b) taking into consideration of possible center points when the light beam 199 is shifted.

The example illustrated in FIGS. 1B-1D may be a simplified illustration because the light beam 199 may not be homogeneous as illustrated in FIG. 1B and FIG. 1D, and the variation may not be in a single direction as illustrated in FIGS. 1C-1D. However, considering that the light beam 199 may be relatively larger compared to the photo detectors 121-124 and that the light beam may be approximately 80% uniform, the first and second center of gravity regions 125, 135 may be approximately within a radius of approximately fifty microns from the intended geometrical center of gravity location or the design value. For example, in the embodiment shown in FIG. 1B, the center of gravity of the first group 120 of the plurality of sensors 121-124 may be the cross point of the horizontal axis X and the vertical axis Y, but the first center of gravity region 125 may be approximately an area within fifty microns radius from the cross point of the horizontal axis X and the vertical axis Y.

Referring to FIG. 1A, the optical device 100 may be configured to operate in an environment susceptible to a time varying field. An example of such time varying field 198 may be electro-magnetic interference (referred hereinafter as "EMI"). The time varying field 198 may be an electric field, or a magnetic field, an electro-magnetic field, or any other source that may create disturbances to the plurality of sensors 118. The time varying field 198 may be generated externally or internally from a portion of the optical device 100. For optical device 100 operating in noisy environment or being surrounded by heavy machinery or antennas, the time varying field 198 may be from an external source and the magnitude of the time varying field 198 may be significant.

The amount or magnitude of the time-varying field 198 may be a function of time. The plurality of sensors 118 operating in switching modes may be susceptible because the amount of disturbance may have changed in the next time cycle when the switches toggle. In addition, the time varying field 198 may be non homogeneous such that the amount or magnitude of the time-varying field 198 may be a function of location. For example, in the embodiment shown in FIG. 1A, the time varying field 198 may comprise a gradient field that has stronger intensity on one side compared to the other. As a result, the sensors 118 disposed towards the right may receive a higher amount of disturbance. However, the time varying field may vary relative to the distance from the source in a non-linear manner.

In the embodiment shown in FIG. 1A, the first and second center of gravity regions 125, 135 may be substantially overlapping such that disturbances created by the time varying field 198 on the first and second groups 120, 130 of the plurality of sensors 118 may be substantially similar in magnitude. The disturbance may then be substantially canceled by the circuit 140 which may be configured to determine an indication of the signal. As a result, the circuit 140 may comprise an output that is substantially independent from the disturbances created by the time varying field 198. The mechanism of how the disturbance can be created and how the disturbance can be substantially canceled may be understood as explained in FIG. 2A and FIG. 2B.

Figure 2A:
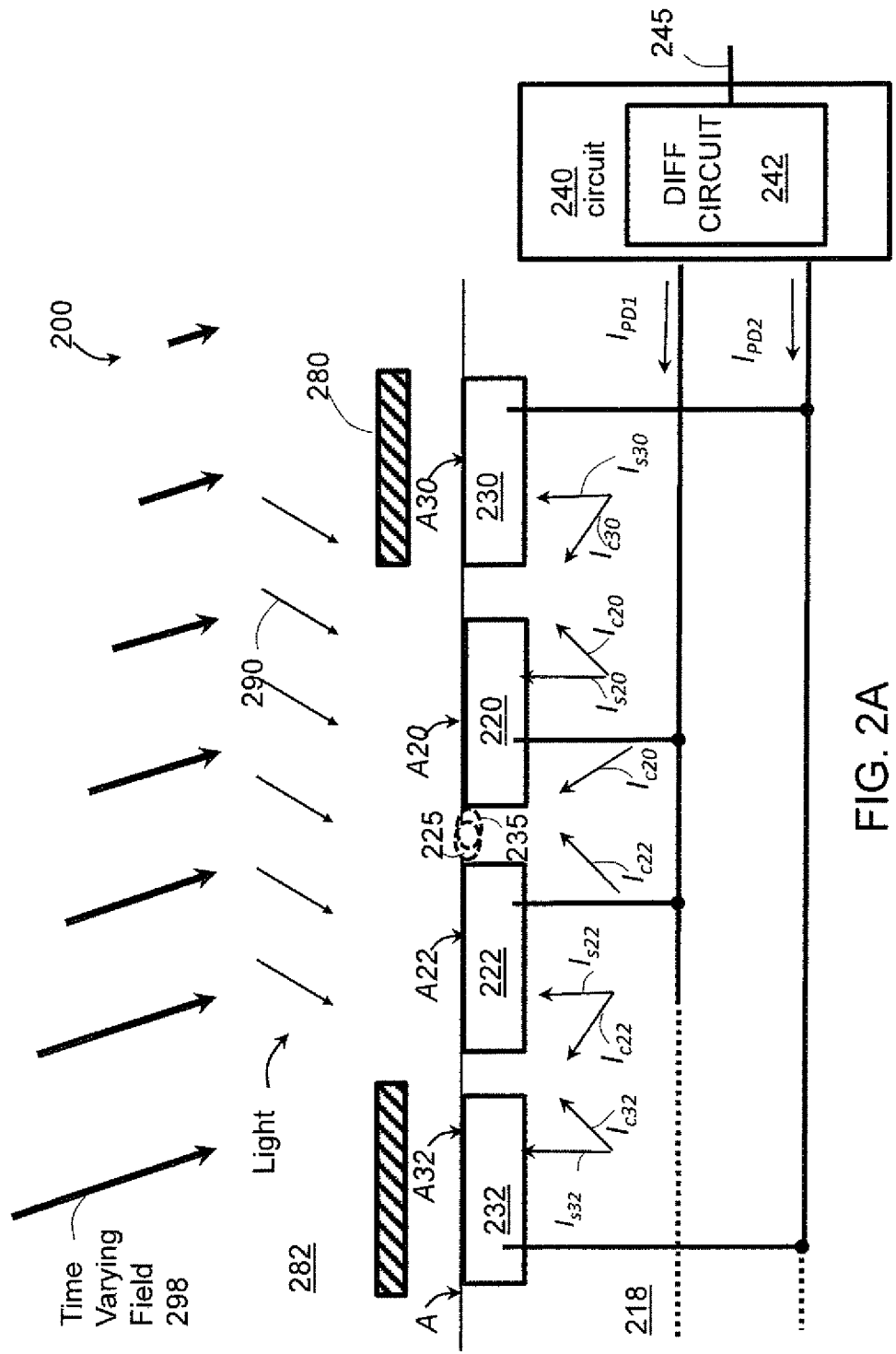
FIG. 2A shows an illustrative cross-sectional view of a plurality of sensors in an optical device for sensing incident light.

Referring now to FIG. 2A. FIG. 2A shows an illustrative cross-sectional view of an optical device 200 for sensing incident light 290. The optical device 200 may comprise a first group of the plurality of sensors 220, 222 and a second group of the plurality of sensors 230, 232. The first group of the plurality of sensors 220, 222 may be exposed to incident light 290. As shown in FIG. 2A, a substantially transparent material 282, such as passivation layer of a semiconductor die for protection purposes may cover the top surface of all sensors 220, 222, 230, 232. However, in addition to the substantially transparent material 282, a substantially opaque material 280 may cover the second group of the plurality of sensors 230, 232. The substantially opaque material 280 may substantially attenuate light 290 and prevent the light 290 from reaching the sensors 230, 232. For example, each sensors of the second group of the plurality of sensors 230, 232 may be shielded from the incident light 290 by a metal layer 280 arranged approximating each of the second group of the plurality of sensors 230, 232.

The amount of light 290 received in the second group of the plurality of sensors 230, 232 may be substantially minimal but may not be zero. Some amount of light 290 may be transmitted via the transparent material 282 that may function as light guide. However, the amount of light 290 received by the second group of sensors 230, 232 may be less than 10% compared to the first group of sensors 220, 222 that may be exposed to the incident light 290. In another embodiment, the amount of light 290 received by the second group of sensors 230, 232 may be less than 5%. In yet another embodiment, the amount of light 290 received by the second group of sensors 230, 232 may be negligibly small such that the second group of sensors 230, 232 may be referred to as "blind sensors".

As illustrated in FIG. 2A, each of the plurality of sensors 220, 222, 230, 232 may collect photocurrents generated therein by the incident light 290, as well as cross-talk currents generated from the neighboring sensors 220, 222, 230, 232. For example, the exposed sensor 220 may collect a photocurrent $I_{s20}$ generated from within the sensor area A20 as well as a crosstalk current $I_{c30}$ generated from neighbouring sensor 230 and a crosstalk current $I_{c22}$ generated from the neighbouring sensor 222. Similarly, the exposed sensor 222 may collect a photocurrent $I_{s22}$ generated from within the sensor area A22 as well as a crosstalk current $I_{c32}$ generated from the neighbouring sensor 232 and a crosstalk current $I_{c20}$ generated from the neighbouring sensor 220. On the other hand, the shielded sensor 230 may collect a photocurrent $I_{s30}$ generated from within the sensor area A30 as well as a crosstalk current $I_{c20}$ generated from the neighbouring sensor 220. Similarly, the shielded sensor 232 may collect a photocurrent $I_{s32}$ generated from within the sensor area A32 as well as a crosstalk current $I_{c22}$ generated from the neighbouring sensor 232 and a crosstalk current $I_{c22}$ generated from the neighbouring sensor 222.

The photocurrents $I_{s20}$ and $I_{s22}$ generated from the exposed sensors 220, 222 may be induced by the incident light 290 as well as dark current or noise, whereas the photocurrents $I_{s30}$ and $I_{s32}$ generated from the shielded sensors 230, 232 may be substantially dark current or noise. Under room temperature or other lower temperature, the photocurrents $I_{s20}$ and $I_{s22}$ from the exposed sensors 220, 222 may be substantially larger compared to the photocurrents $I_{s30}$ and $I_{s32}$ from the shielded sensors 230, 232. However, under high temperature, the dark current may increase exponentially. For example, in one embodiment, the photocurrents $I_{s20}$ and $I_{s22}$ from the exposed sensors 220, 222 may be approximately more than twenty times larger compared to the photocurrents $I_{s30}$ and $I_{s32}$ from the shielded sensors 230, 232 at room temperature, but when the temperature increase to 85 degree Celsius, the photocurrents $I_{s20}$ and $I_{s22}$ from the exposed sensors 220, 222 may be approximately five times larger compared to the photocurrents $I_{s30}$ and $I_{s32}$ from the shielded sensors 230, 232.

The cross talk photocurrents $I_{c20}$ and $I_{c22}$ of the exposed sensors 220, 222 may be relatively smaller in magnitude compared to the photocurrents $I_{s20}$ and $I_{s22}$ generated by the respective exposed sensors 220, 222. Under normal operating temperature, the cross talk photocurrents $I_{c30}$ and $I_{c32}$ from the shielded sensors 230, 232 may be relatively small and almost negligible compared to the photocurrents $I_{s20}$ and $I_{s22}$ generated by the exposed sensors 220, 222. In one embodiment, the crosstalk currents $I_{c20}$ and $I_{c22}$ of the exposed sensors 220, 222 may be approximately less than one fourth of the photocurrents $I_{s20}$ and $I_{s22}$ of the respective exposed sensors 220, 222 respectively. However, the crosstalk currents $I_{c20}$ and $I_{c22}$ may be reduced further if the sensors 220, 222, 230, 232 are spaced apart further.

As shown in FIG. 2A, the photo-signals generated by the first group of the plurality of exposed sensors 220, 222 may be aggregated to form a first differential signal $I_{PD1}$. Similarly, the photo-signals generated by the second group of the plurality of shielded sensors 230, 232 may be aggregated to form a second differential signal $I_{PD2}$. The circuit 240 may comprise a differential circuit 242 configured to produce an output that may be indicative of a difference between the first and second differential signals $I_{PD1}$ and $I_{PD2}$. In this manner, the output may be substantially independent of dark current, noise or crosstalk. For example, the dark current generated within the exposed sensor 222 may be substantially similar to the dark current collected by the shielded sensor 232 and may be canceled or substantially canceled by the circuit 240. Similarly, the crosstalk current collected by the exposed sensor 222 from the exposed sensor 220 may also be canceled or substantially canceled because the shielded sensor 230 may collect the similar crosstalk current. The exposed sensor 222 and the shielded sensor 232 that operate to cancel off noise may be referred to as a dipole pair.

Figure 2B:
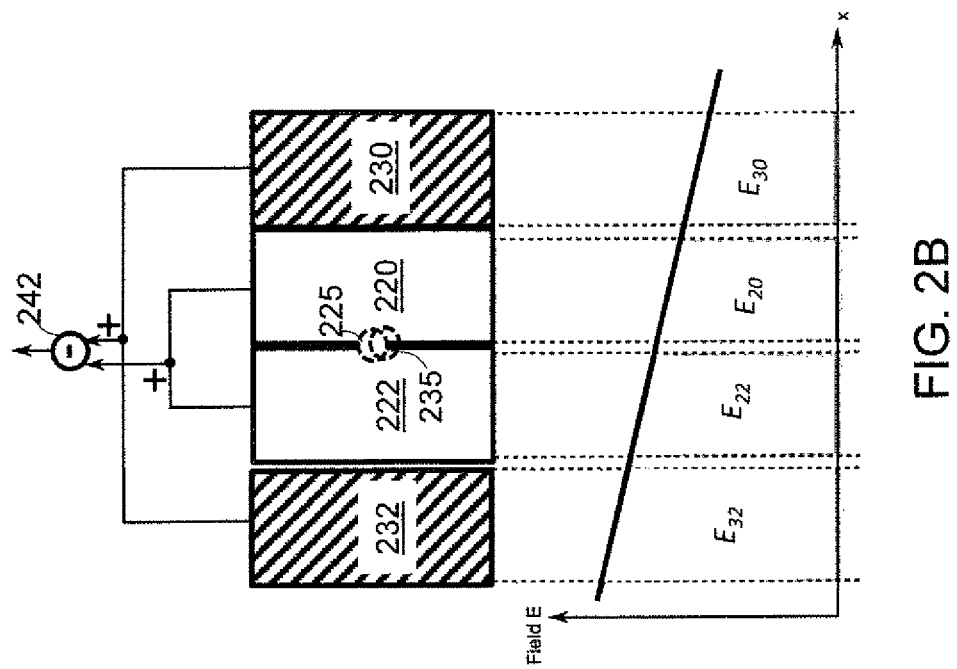
FIG. 2B shows an illustrative top view of the plurality of sensors in the optical device shown in FIG. 2A.

In the embodiment shown in FIG. 2A, both the exposed sensors 220, 222 and the shielded sensors 230, 232 may be susceptible to a time-varying field 298 such as a lateral decaying EMI 298. As illustrated by the top illustrative view shown in FIG. 2B, the EMI 298 may affect each of the sensors 220, 222, 230, 232 differently. Referring to FIG. 2A and FIG. 2B, the shielded sensor 232 may be the most susceptible to the EMI 298 but the shielded sensor 230 may be the least susceptible to the EMI 298. Both the exposed sensors 220 and 222 may be less susceptible to the EMI 298 compared to the shielded sensor 232 but more susceptible to the EMI 298 compared to the shielded sensor 230. On average, the effect of the EMI 298 on the first group of exposed sensors 220, 222 and the second group of shielded sensors 230, 232 may be substantially similar.

As shown in FIG. 2A and FIG. 2B, the first group of exposed sensors 220, 222 may be arranged around a first center of gravity region 225 and the second group of shielded sensors 230, 232 may be arranged around a second center of gravity region 235. The first and second center of gravity regions 225, 235 may be substantially overlapping such that disturbances created by the EMI 298 on the first and second groups of the plurality of sensors 220, 222, 230, and 232 may be substantially similar in magnitude such that the effect of the EMI 298 may be substantially canceled.

For non-linear time varying field 298, the cancellation may not be as effective compared to a linear gradient field as shown in FIG. 2B. However, even in absolute worst case estimation, by arranging the sensors 220, 222, 230, 232 such that the first and second center of gravity regions 225, 235 may substantially overlap, a factor of 4 times (12 dB) better performance may be possible to achieve. The performance may be further improved by using a greater number of the sensors 220, 222, 230, 232 with each sensor 220, 222, 230, 232 having a small area.

Figure 3:
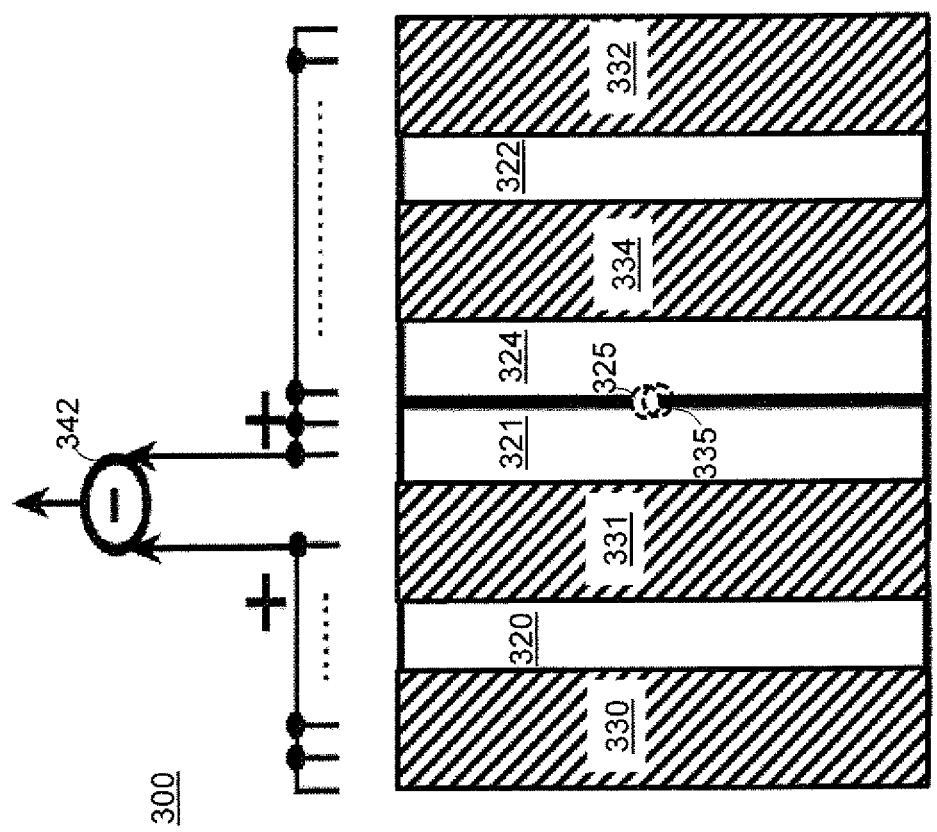
FIG. 3 illustrates an arrangement of a plurality of sensors in a one dimension array.

The plurality of sensors 220, 222, 230, 232 may be arranged in an array. The array of the plurality of sensors 220, 222, 230, 232 may have an even number of rows. Alternatively, the array of the plurality of sensors 220, 222, 230, 232 may have an even number of columns. FIG. 3 illustrates an arrangement of an optical device 300 in a one-dimension array. The optical device 300 may comprise a first group of the plurality of sensors 320-324 arranged around a center of gravity region 325, a second group of the plurality of sensors 330-334 arranged around a center of gravity region 335, and a circuit 342. The first group of the plurality of sensors 320-324 may be substantially exposed to light whereas the second group of the plurality of sensors 330-334 may be substantially shielded from light. The first and second center of gravity regions 325, 335 may be substantially overlapping similar to the embodiment shown in FIG. 2A.

Figure 4:
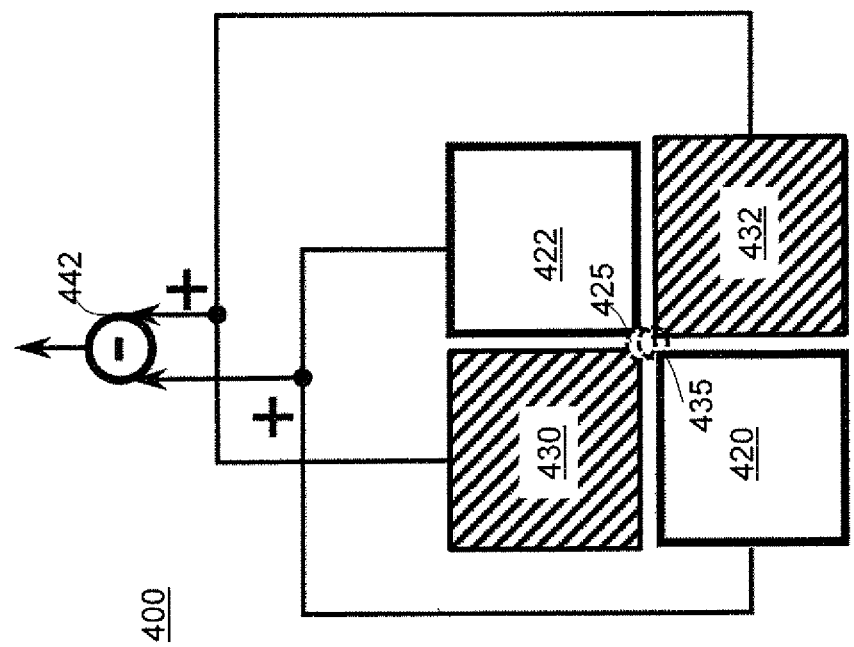
FIG. 4 illustrates an arrangement of a plurality of sensors in a two-dimension array.

FIG. 4 illustrates an arrangement of an optical device 400 in a two-dimension array. The optical device 400 may comprise a first group of the plurality of sensors 420, 422 arranged around a center of gravity region 425, a second group of the plurality of sensors 430, 432 arranged around a center of gravity region 435, and a circuit 442. The first group of the plurality of sensors 420, 422 may be substantially exposed to light whereas the second group of the plurality of sensors 430, 432 may be substantially shielded from light. The first and second center of gravity regions 425, 435 may be substantially overlapping similar to the embodiment shown in FIG. 2A and FIG. 3.

Figure 5:
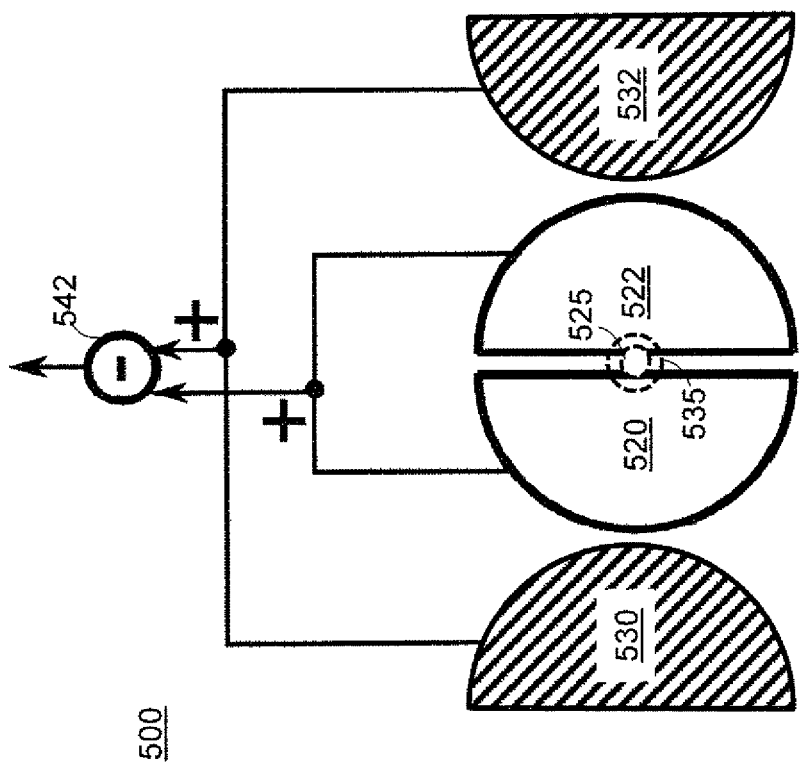
FIG. 5 illustrates an arrangement of a plurality of sensors having substantially semi-circular shape.

FIG. 5 illustrates an arrangement of an optical device 500. The optical device 500 may comprise a circuit 542, a first group of exposed sensors 520, 522, and a second group of shielded sensors 530, 532. The optical device 500 may be substantially similar to the optical device 200 shown in FIG. 2A, except at least in that each member of the first group of exposed sensors 520, 522, and the second group of shielded sensors 530, 532 may be formed in substantially semi-circular shape. In addition, the center of gravity region 525 of the first group of exposed sensors 520, 522 may be encompassed within the center of gravity region 535 of the second group of shielded sensors 530, 532.

Figure 6:
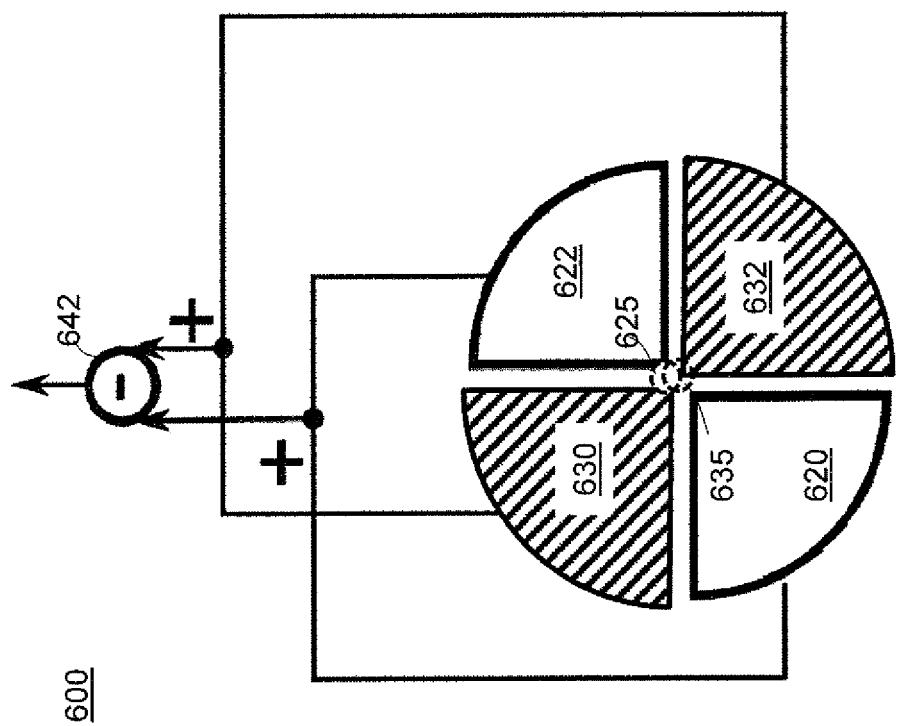
FIG. 6 illustrates an arrangement of a plurality of sensors in substantially circular shape in two-dimension array.

FIG. 6 illustrates an arrangement of an optical device 600. The optical device 600 may comprise a circuit 642, a first group of exposed sensors 620, 622, and a second group of shielded sensors 630, 632. The first group of exposed sensors 620, 622 may be arranged around a center of gravity region 625 whereas the second group of shielded sensors 630, 632 may be arranged around a center of gravity region 635. The optical device 600 may be substantially similar to the optical device 400 shown in FIG. 4 except at least in that each member of the first group of exposed sensors 620, 622, and the second group of shielded sensors 630, 632 may be a quadrant of a substantially circular shape. As shown in FIG. 6, the plurality of sensors 620, 622 630, 632 may form a substantially circular shape collectively and each of the plurality of sensors 620, 622 630, 632 may be a sector of the circular shape. This arrangement of having the plurality of sensors 620, 622, 630, 632 being a sector of circular shape may enable the plurality of sensors 620, 622, 630, 632 of the optical device 600 to response collectively in a substantially similarly manner towards a time varying field that may approach the optical device 600 from different directions.

In another embodiment, each member of the first group of exposed sensors 620, 622, and the second group of shielded sensors 630, 632 may be a sector of a substantially circular shape. In yet another embodiment, each member of the first group of exposed sensors 620, 622, and the second group of shielded sensors 630, 632 may be substantially circular shape arranged such that the center of gravity regions 625, 635 may be substantially overlapping.

Figure 7:
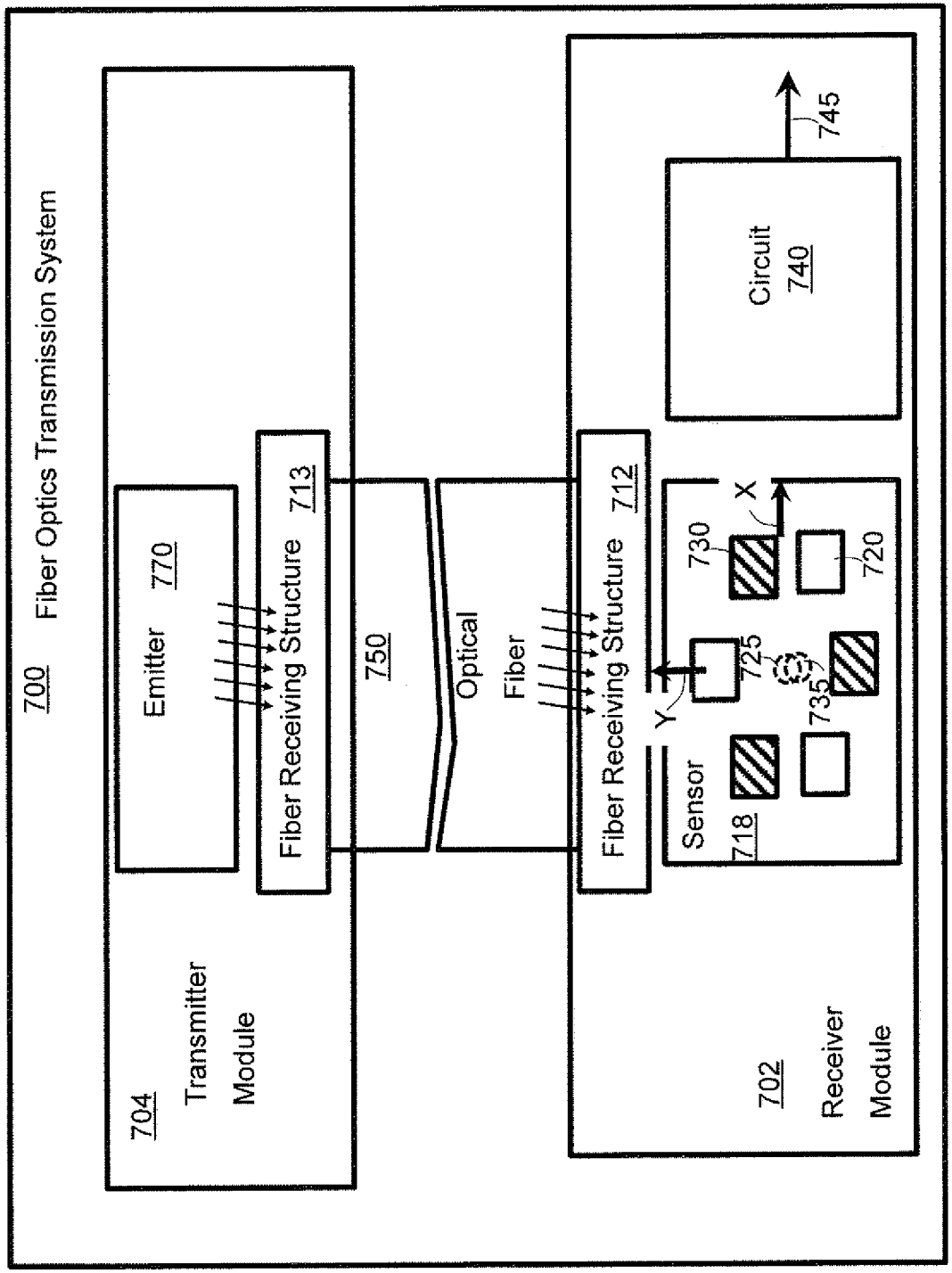
FIG. 7 illustrates a block diagram of a fiber optics transmission system.

FIG. 7 illustrates a block diagram of a fiber optics transmission system 700. The fiber optics transmission system 700 may comprise a transmitter module 704, a receiver module 702 and an optical fiber 750 coupling the transmitter module 704 and the receiver module 702. The transmitter module 704 may comprise an emitter 770, a fiber receiving structure 713 for receiving the optical fiber 750. The emitter 770 may be configured to emit a light signal that may be transmitted to the optical fiber 750 and finally towards the receiver module 702.

The receiver module 702 configured to receive the optical fiber 750 via a fiber receiving structure 712. The receiver module 702 may further comprise a plurality of sensors 718 arranged approximating the optical fiber 750 for receiving the light signal. The plurality of sensors 718 may comprise a circuit 740, a first group 720 and a second group 730 of the plurality of sensors 718. The first group 720 of the plurality of sensors 718 may be substantially exposed to the optical fiber 750 for receiving the light signal. The first group 720 of the plurality of sensors 718 may be exposed to the light signal such that each member of the first group 720 of the plurality of sensors 718 may be configured to generate a signal that may correlate to the light signal. On the other hand, the second group 730 of the plurality of sensors 718 may be shielded from receiving the light signal using a substantially opaque layer. In other words, the second group 730 of the plurality of sensors 718 may be shielded such that each of the second group 730 of the plurality of sensors 718 may be configured to generate a signal substantially independent from the light signal. The signal generated from the second group 730 of the plurality of sensors 718 may substantially correlate to at least one of dark current, noise and cross talk.

The circuit 740 may be configured to generate an electrical output signal 745 that may correlate to the light signal. Each member of the first and second groups 720, 730 of the plurality of sensors 718 may be arranged around a center of gravity region 725, 735 such that the electrical output signal 745 may be substantially independent from disturbances created by an electro-magnetic interference on the first and second groups 720, 730 of the plurality of sensors 718. The center region 725, 735 may comprise substantially a center of gravity region 725 of the first group 720 of the plurality of sensors 718, and a center of gravity region 735 of the second group 730 of the plurality of sensors 718. In one embodiment, the center of gravity region 725 of the first group 720 of the plurality of sensors 718 and the center of gravity region 735 of the second group 730 of the plurality of sensors 718 may be substantially overlapping. In addition, the first and second groups 720, 730 of the plurality of sensors 718 may be arranged proximate to the center region 725, 735 such that disturbances created by the electro-magnetic interference on the first and second groups 720, 730 of the plurality of sensors 718 may be substantially similar, so as to be substantially canceled by the circuit 740.

As shown in FIG. 7, the plurality of sensors 718 may be arranged in a two-dimensional plane having an X-axis and a Y-axis that may be mutually orthogonal. The first and second groups 720, 730 of the plurality of sensors 718 may be arranged symmetrically relative to at least one axis of a pair of mutually orthogonal axes. For example, in the embodiment shown in FIG. 7, the first and second groups 720, 730 of the plurality of sensors 718 may be arranged symmetrically relative to at least one of the X-axis and the Y-axis. In another embodiment, the first and second groups 720, 730 of the plurality of sensors 718 may be arranged symmetrically relative to both members of a pair of mutually orthogonal axes. For example, the plurality of sensors 718 may be arranged symmetrically relative to both the X-axis and the Y-axis.

Figure 8A:
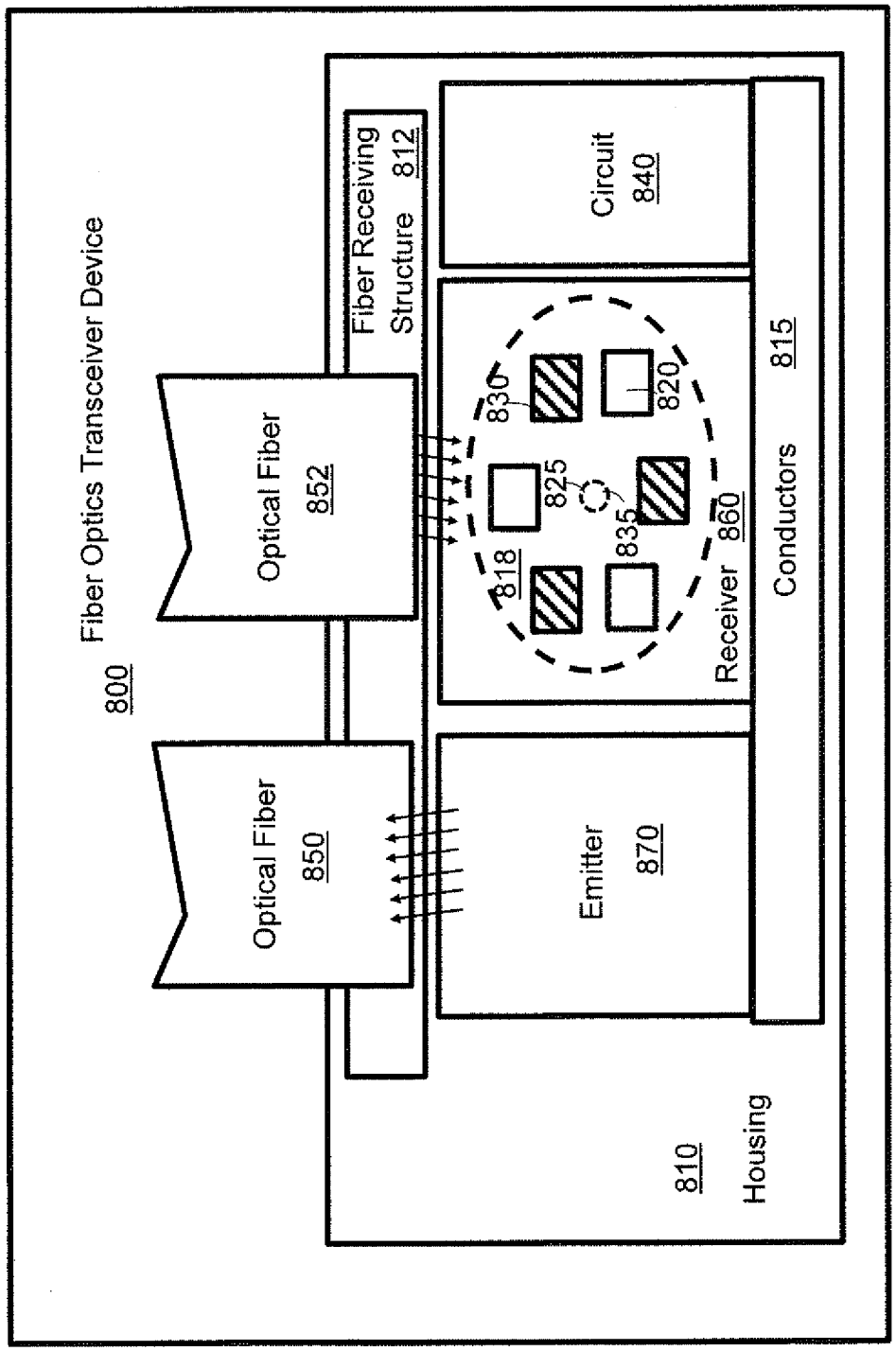
FIG. 8A illustrates a block diagram of a fiber optics transceiver device.

FIG. 8A illustrates a block diagram of a fiber optics transceiver device 800. The fiber optics transceiver device 800 may comprise a housing 810, a plurality of conductors 815, a circuit 840, an emitter 870, a receiver 860 and a fiber receiving structure 812. The circuit 840, the emitter 870 and the receiver 860 may be coupled to at least one of the conductors 815. The fiber receiving structure 812 may be configured to receive at least one optical fiber 850. The emitter 870 and the receiver 860 may be optically coupled to the at least one optical fiber 850. In the embodiment shown in FIG. 8A, the optical fiber 850 may comprise an additional optical fiber 852 such that each of the emitter 870 and the receiver 860 may be coupled to two respective optical fibers 850, 852 respectively. In another embodiment using a bi-directional optical transceiver 800, the fiber optics transceiver device 800 may be coupled to only one optical fiber 850. The receiver 860 may comprise a plurality of sensors 818. The plurality of sensors 818 may comprise a first set 820 of the plurality of sensors 818 substantially exposed to incident light and a second set 830 of the plurality of sensors 818 substantially shielded from incident light.

Figure 8B:
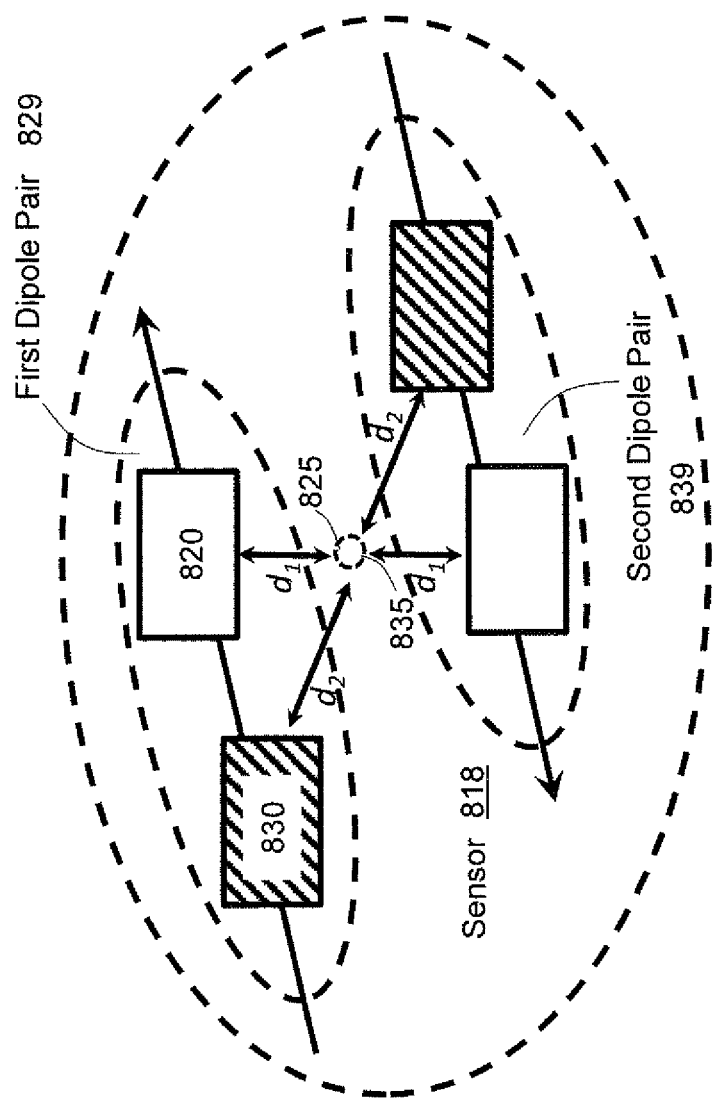
FIG. 8B illustrates an illustrative view of the sensors in dipole arrangement.

The plurality of sensors 818 shown in FIG. 8B may not be arranged in array form but distributed within a substantially circular area. This arrangement may enable the plurality of sensors 818 to response substantially similarly towards time varying field that comes from different directions. However, the plurality of sensors 818 may be arranged such that center of gravity region 825, 835 of each set of the first and second sets 820, 830 of the plurality of sensors 818 may be formed at a center region 825, 835 of the plurality of sensors 818 such that disturbances created by a time varying field on the first and second sets 820, 830 of sensors 818 respectively may be substantially similar. In the embodiment shown in FIG. 8A and FIG. 8B, the center region 825, 835 may comprise a center of gravity region 825 of the first set of sensors 818, and a center of gravity region 835 of the second set of sensors 818. The center of gravity region 825 may be completely overlapping with the center of gravity region 835.

Each member of the first set 820 of the plurality of sensors 818 may be arranged at equal (or substantially equal) distance d1 from the center region 825, 835, whereas each member of the second set 830 of the plurality of sensors 818 may be arranged at equal (or substantially equal) distance d2 from the center region 825, 835. The plurality of sensors 818 may be seen and/or understood as being arranged in dipole pairs, as shown in FIG. 8B. Each sensor 818 of the first set 820 may be seen and/or understood as the positive pole for generating signal in accordance to light, whereas each sensor 818 of the second set 830 that is shielded may be seen as the negative pole for subtracting noise from the positive pole. Each of the first and second sets 820, 830 of the plurality of sensors 818 may comprise at least one respective dipole sensor pair having the center region 825, 835 interposed there between. For example, in FIG. 8B, the first dipole pair 829 and the second dipole pair 839 may each have the center region 825, 835 interposed there between. The dipole pairs may be arranged in opposite direction as illustrated in FIG. 8B. In another embodiment, each of the first and second sets 820, 830 may comprise more than two respective dipole sensor pair interposing the center region 825, 835 there between. For illustrative purposes in highlighting and/or distinguishing the first group 820 from the second group 830 of the plurality of sensors 818, in the figures the second group 830 is depicted with hatching, while the first group 820 is depicted without hatching.

Figure 9:
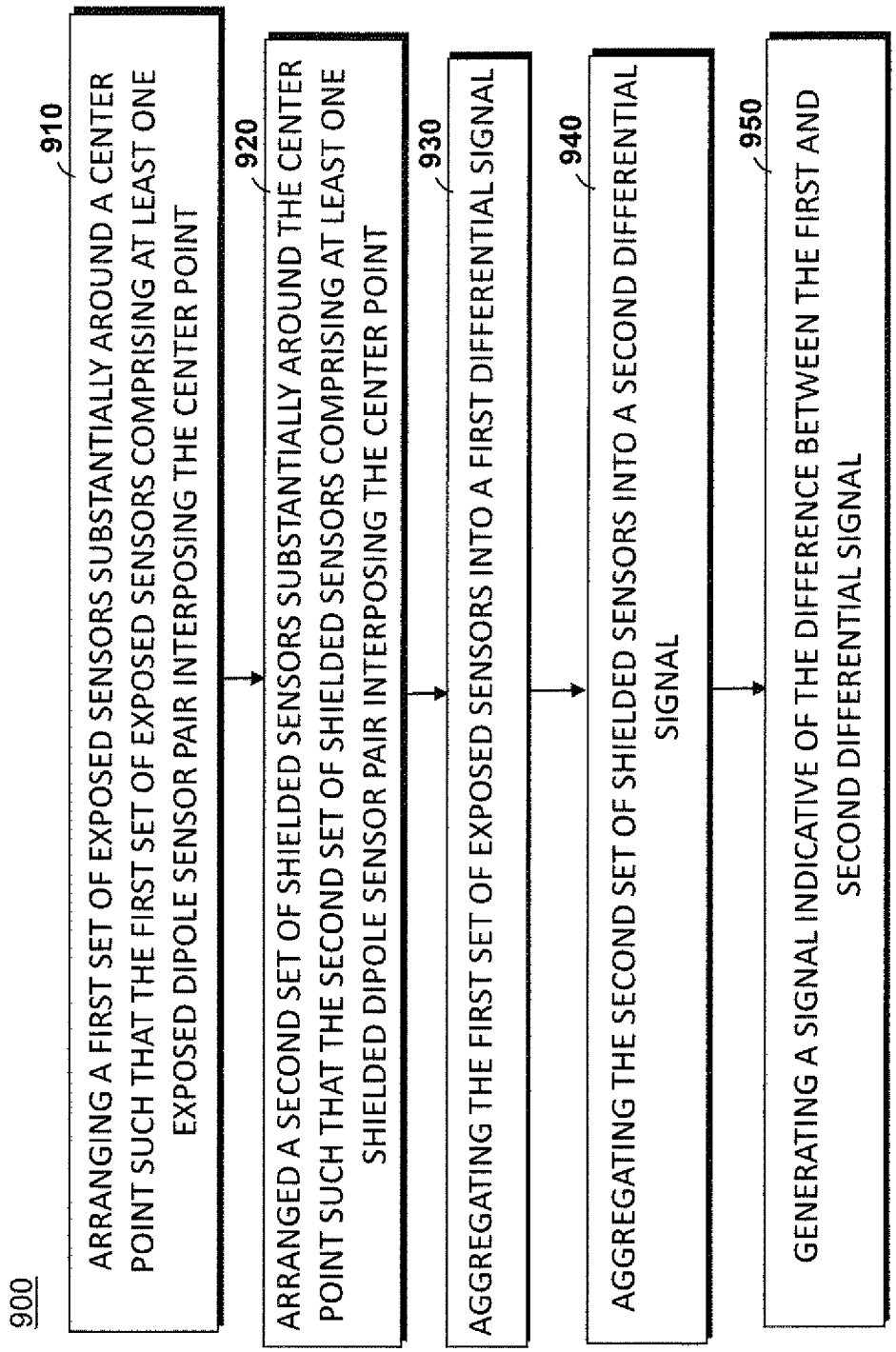
FIG. 9 illustrates a flow chart showing a method for reducing disturbances created by an electro-magnetic interference on a plurality of photo-sensors.

FIG. 9 illustrates a flow chart showing a method for reducing disturbances created by an electro-magnetic interference on a plurality of photo-sensors. The plurality of photo-sensors may comprise a first set of exposed sensors and a second set of shielded sensors. In step 910, the first set of exposed sensors may be arranged substantially around a center point such that the first set of exposed sensors comprising at least one exposed dipole sensor pair interposing the center point. Next, in step 920, the second set of shielded sensors may be arranged substantially around the center point such that the second set of shielded sensors comprising at least one shielded dipole sensor pair interposing the center point. The method then proceed to step 930 in which the first set of exposed sensors may be aggregated into a first differential signal whereas in step 940, the second set of shielded sensors may be aggregated into a second differential signal. In step 950, a signal indicative of the difference between the first and second differential signal may be generated by a circuit.

Different aspects, embodiments or implementations may, but need not, yield one or more of the following advantages. For example, the arrangement of the sensors around the center region or center of gravity regions, which may be overlapping, may enable the device to be more tolerant of time varying field disturbances. In addition, one or more sensors may be formed using the substantially circular shape disclosed in FIG. 4, FIG. 5, FIG. 6 and FIG. 8B. The arrangement and/or the substantially circular shape may be relatively more tolerant of disturbances related to the time varying field. Different aspects presented in various embodiments may be advantageous, such as enabling the device to be possibly more effective, or possibly enabling the device to be substantially tolerant of time varying field disturbances.

Although specific embodiments of the invention have been described and illustrated herein above, the invention should not be limited to any specific forms, combinations or arrangements of parts so described and illustrated. For example, although fiber optics transmission system and fiber optics transceiver devices are illustrated in the embodiment shown in FIG. 7 and FIG. 8A respectively, the teaching may be application to other similar opto-electronic devices, opto-electronic components and opto-electronic packaging for some other applications. Throughout the specification and the claims, when one of the optical device, fiber optics transmission system, and fiber optics transceiver device is mentioned, all other variations, including not specifically mentioned in this Specification, should be taken into consideration. A feature illustrated in one embodiment may be combined into another embodiment. Likewise, although sensors were discussed, the embodiments are applicable to other photo-detectors such as a phototransistor and photo-diodes. The scope of the invention is to be defined by the claims appended hereto and their equivalents.

What is claimed is:

1. An optical device for sensing incident light that is indicative of a signal, comprising:
a plurality of sensors arranged in a substantially co-planar arrangement configured to generate photo-signals;
a first group of the plurality of sensors being configured to be exposed to the incident light;
a first center of gravity region of the first group of the plurality of sensors;
a second group of the plurality of sensors being configured to be shielded from the incident light;

a second center of gravity region of the second group of the plurality of sensors, wherein the first and second center of gravity regions are substantially overlapping such that disturbances created by a time varying field on the first and second groups of the plurality of sensors are substantially similar in magnitude; and a circuit configured to determine an indication of the signal, wherein the circuit has an output that is substantially independent from the disturbances created by the time varying field.

2. The optical device of claim 1, wherein the photo-signals generated by the first group of the plurality of sensors are aggregated to form a first differential signal.

3. The optical device of claim 2, wherein the photo-signals generated by the second group of the plurality of sensors are aggregated to form a second differential signal.

4. The optical device of claim 3, wherein the output of the circuit is indicative of a difference between the first and second differential signals.

5. The optical device of claim 1, wherein the first and second groups of the plurality of sensors comprise substantially equal numbers of sensors.

6. The optical device of claim 1, wherein the plurality of sensors are arranged in an array.

7. The optical device of claim 6, wherein the array of the plurality of sensors has an even number of rows.

8. The optical device of claim 6, wherein the array of the plurality of sensors has an even number of columns.

9. The optical device of claim 1, wherein each of the plurality of sensors has a substantially semi-circular shape.

10. The optical device of claim 1, wherein the plurality of sensors form a substantially circular shape collectively, and wherein each of the plurality of sensors is a sector of the substantially circular shape.

11. The optical device of claim 1, wherein each sensor of the second group of the plurality of sensors is shielded from the incident light by a metal layer arranged approximating each of the second group of the plurality of sensors.

12. The optical device of claim 1 forms a portion of an optical receiver having a fiber receiving structure configured to receive an optical fiber.

13. A fiber optics transmission system, comprising:
a transmitter module;
an emitter of the transmitter module configured to emit a light signal;
an optical fiber optically coupled to the emitter of the transmitter module;
a receiver module configured to receive the optical fiber;
a plurality of sensors of the receiver module arranged approximating the optical fiber;
a first group of the plurality of sensors being substantially exposed to the optical fiber for receiving the light signal;
a second group of the plurality of sensors being substantially shielded from receiving the light signal; and
a circuit coupled to the first and second groups of the plurality of sensors, the circuit configured to generate an electrical output signal,
wherein each member of the first and second groups of the plurality of sensors is arranged around a center of gravity region such that the electrical output signal is substantially independent of disturbances created by an electromagnetic interference on the first and second groups of the plurality of sensors.

14. The fiber optics transmission system of claim 13, wherein the first and second groups of the plurality of sensors are arranged such that disturbances created by the electromagnetic interference on the first and second groups of the plurality of sensors are substantially similar, so as to be substantially canceled by the circuit.

15. The fiber optics transmission system of claim 13, wherein the first and second groups of the plurality of sensors are arranged symmetrically relative to at least one of axis of a pair of mutually orthogonal axes.

16. The fiber optics transmission system of claim 13, wherein the first and second groups of the plurality of sensors are arranged symmetrically relative to both members of a pair of mutually orthogonal axes.

17. The fiber optics transmission system of claim 13, wherein the second group of the plurality of sensors are shielded such that each member of the second group of the plurality of sensors is configured to generate a photo-signal substantially independent from the light signal.

18. An optical transceiver device coupled to at least one optical fiber, comprising:
a housing configured to receive the at least one optical fiber;
an emitter disposed within the housing approximating the at least one optical fiber;
a receiver disposed within the housing approximating the at least one optical fiber; and
a plurality of sensors of the receiver having a first set of the plurality of sensors being exposed to incident light and a second set of the plurality of sensors being shielded from incident light,
wherein the plurality of sensors are arranged such that center gravity of each set of the first and second sets of the plurality of sensors is formed proximate to a central region of the plurality of sensors such that disturbances created by a time varying field on the first and second sets of the plurality sensors respectively are substantially similar.

19. The optical transceiver device of claim 18, wherein each of the first and second sets of the plurality of sensors comprises at least a respective dipole sensor pair having the central region interposed there between.

20. The optical transceiver device of claim 18, wherein the plurality of sensors are arranged within a substantially circular area.

* * * * *